US012645592B1

(12) United States Patent
Chiley et al.

(10) Patent No.: US 12,645,592 B1
(45) Date of Patent: Jun. 2, 2026

(54) UPDATING KV-CACHE ACROSS TRANSFORMER LAYERS

(71) Applicant: Databricks, Inc., San Francisco, CA (US)

(72) Inventors: Vitaliy A. Chiley, San Diego, CA (US); Shashank Rajput, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 19/012,576

(22) Filed: Jan. 7, 2025

(51) Int. Cl.
*G06F 12/0802* (2016.01)
*G06N 3/0455* (2023.01)

(52) U.S. Cl.
CPC ....... *G06F 12/0802* (2013.01); *G06N 3/0455* (2023.01); *G06F 2212/1041* (2013.01)

(58) Field of Classification Search
CPC ........ G06F 12/0802; G06F 2212/1041; G06N 3/0455
See application file for complete search history.

(56) References Cited

U.S. PATENT DOCUMENTS

| 2025/0014590 A1* | 1/2025 | Lopatka | ................. | G10L 15/16 |
| 2025/0094712 A1* | 3/2025 | Jha | ........................ | G06F 16/285 |
| 2025/0348434 A1* | 11/2025 | Lee | ..................... | G06F 12/0846 |

OTHER PUBLICATIONS

Xiong, Yi, et al. "Layerkv: Optimizing large language model serving with layer-wise kv cache management." arXiv preprint arXiv: 2410.00428 (2024). (Year: 2024).*
Character.AI, "Optimizing AI Interference at Character.AI" Jun. 20, 2024, pp. 1-5, [Online] [Retrieved on Apr. 18, 2025] Retrieved from the Internet<URL: https://research.character.ai/optimizing-inference/>.
Lages, J., "Transformers KV Caching Explained," Oct. 8, 2023, pp. 1-10, [Online] [Retrieved on Apr. 18, 2025] Retrieved from the Internet<URL: https://medium.com/@joaolages/kv-caching-explained-276520203249>.

* cited by examiner

*Primary Examiner* — Nicholas J Simonetti
(74) *Attorney, Agent, or Firm* — Fenwick & West LLP

(57) ABSTRACT

A data processing service generates keys and values for decoder layers. The service receives a request from a client device. The service accesses a ML transformer architecture which includes decoder layers. Each decoder layer is associated with a KV-cache. The service applies the transformer architecture to input tokens obtained from the request to generate output tokens. For each decoder layer, the service generates keys and values for a current decoder layer. The keys and the values for the current decoder layer are generated by applying trained values for a set of parameters to keys and values for a previous decoder layer. The service obtains queries from inputs to the current decoder layer and generates attention outputs for the current decoder layer by combining the queries with the keys and the values for the current decoder layer. The service generates a response to the request from the output tokens.

20 Claims, 8 Drawing Sheets

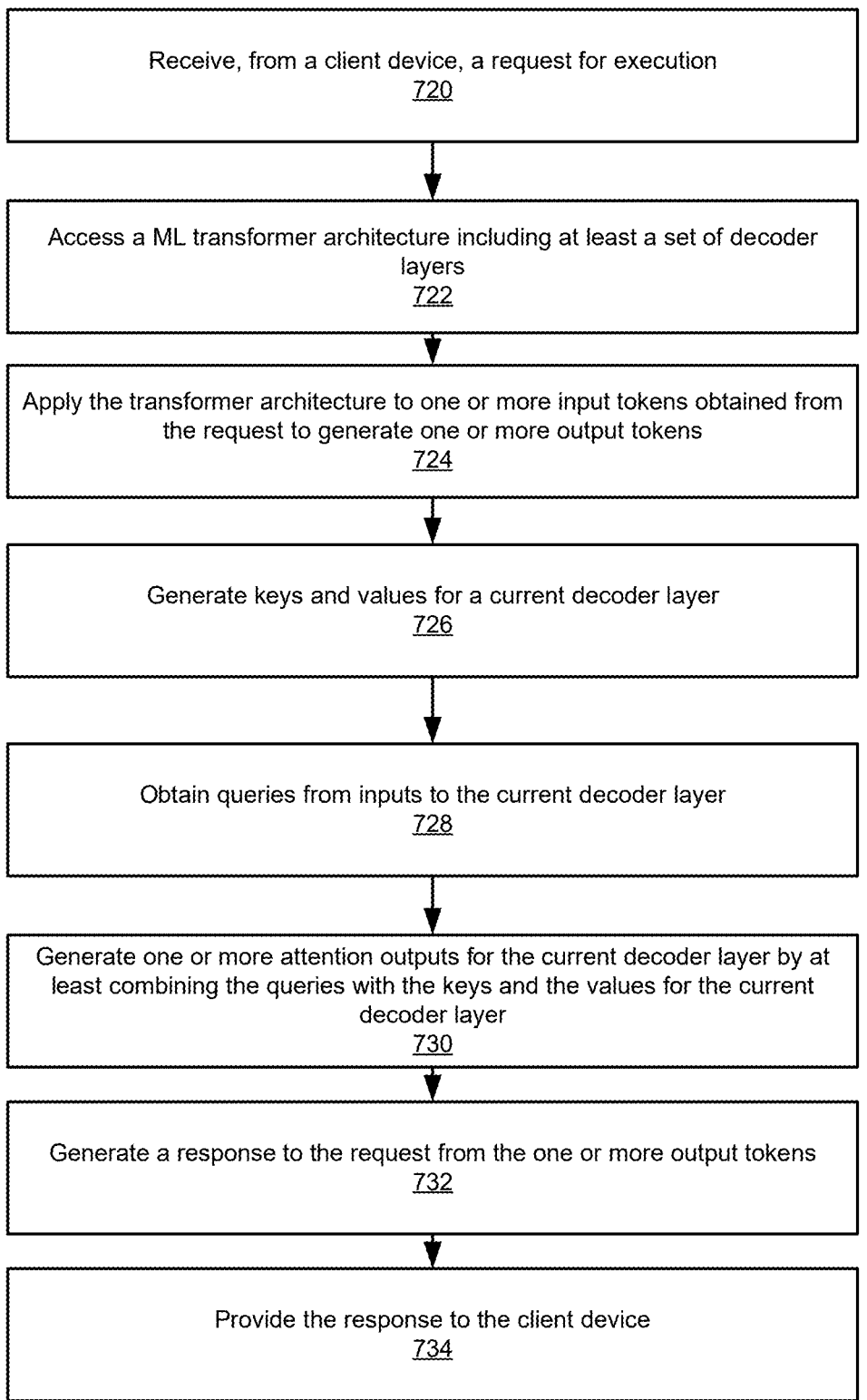

Receive, from a client device, a request for execution
720

Access a ML transformer architecture including at least a set of decoder layers
722

Apply the transformer architecture to one or more input tokens obtained from the request to generate one or more output tokens
724

Generate keys and values for a current decoder layer
726

Obtain queries from inputs to the current decoder layer
728

Generate one or more attention outputs for the current decoder layer by at least combining the queries with the keys and the values for the current decoder layer
730

Generate a response to the request from the one or more output tokens
732

Provide the response to the client device
734

FIG. 7

UPDATING KV-CACHE ACROSS TRANSFORMER LAYERS

BACKGROUND

The disclosed configuration relates generally to concepts, and more particularly to maintaining and generating key and value caches (KV-caches) for machine-learning transformer architectures.

Data processing services offer a range of services to store and process user data efficiently. In the current transformer-based models (e.g., LLMs), the transformer architecture has at least a set of decoder layers. Each decoder layer has an attention layer that obtains keys, values, queries, and combines these to generate attention outputs. During inference time, the transformer autoregressively generates output tokens from a previous token. At a given attention layer, since the keys and values that were previously generated are reused for subsequent iterations, they are stored in a KV-cache for the attention layer. However, it is computationally expensive to generate the keys and values for each attention layer from the inputs, especially if many output tokens are generated.

BRIEF DESCRIPTION OF THE DRAWINGS

Figure (FIG. 1 is a high-level block diagram of a system environment for a data processing service, in accordance with an embodiment.

FIG. 7 is a flowchart of a method for determining data elements in a data set that are relevant to a concept using machine-learning models, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Disclosure Overview

The KV-cache plays an important role in improving the efficiency of transformer models during autoregressive text generation. While it significantly reduces computational costs compared to recalculating attention weights for previous tokens at every step, the current implementations still have scalability, efficiency, and performance challenges. While current technologies have introduced useful optimizations, they cannot fully address the issues of KV-cache memory consumption and computational overhead.

For each layer in the set of transformer layers, a data processing service generates keys and values for a current layer. The keys and the values for the current layer are generated by applying trained values for a set of parameters to keys and values for a previous layer. This way, the data processing service can generate the KV-cache for at least a subset of layers by applying an efficient learned set of parameters to a KV-cache for a previous layer. Therefore, the data processing service may maintain a KV-cache in memory for one of the layers, but separate KV-caches may not need to be maintained for the remaining layers of the subset need to be a dedicated KV-cache, saving significant memory resources especially when the transformer architecture is a large-scale model.

Figure 1:
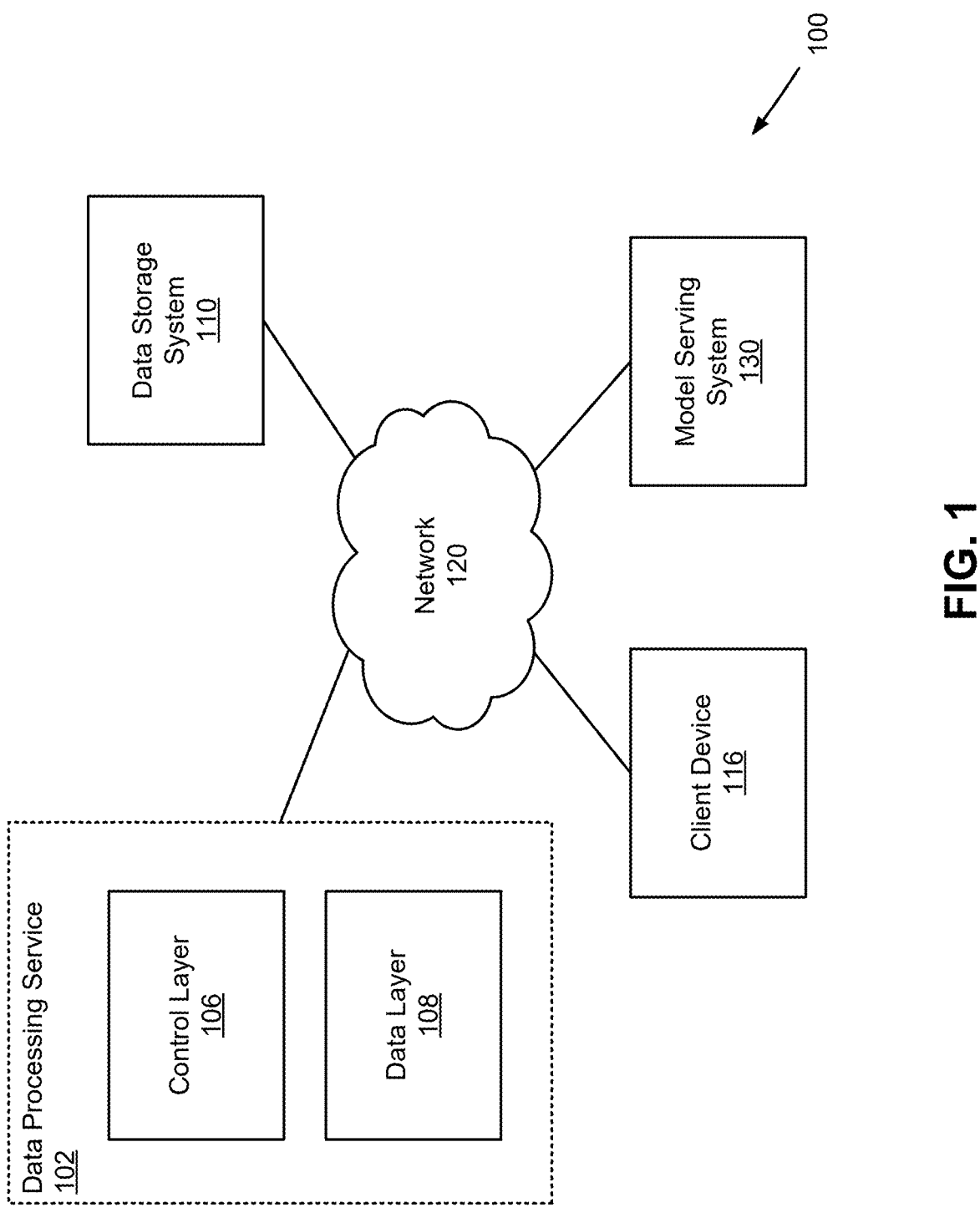

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 800 as described with FIG. 8. In some embodiments, the computing devices may be configured with software to function as specifically described herein. For example, program code comprised of instructions may cause a processing system to be structured in a manner so that the device operates the specific functionality upon execution of the program code.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. In one embodiment, the requests may include machine learning and artificial intelligence (AI) related requests on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116.

The data layer 108 includes computing resources that execute one or more tasks or jobs received from the control layer 106. Accordingly, the data layer 108 may include compute resources for executing the jobs. An example of a compute resource is described in relation to FIG. 3. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, the compute resources are configured with one or more hardware accelerators, such as graphic processor units (GPUs), tensor processor units (TPUs), neural processing units (NPUs) that can accelerate the training or inference process of large-scale machine learning models or AI models. Computing architecture that may be used with such hardware accelerators may involve some or all of the components of a computer system as described with FIG. 8. The data layer 108 may include resources not available to a developer on a local development system, such as powerful computing resources to process very large data sets.

KV-cache is a mechanism used in transformer-based models, particularly during autoregressive inference, to perform computations in the attention mechanism. In transformers, attention works by comparing the current token's query vector to the keys to generate attention scores, and aggregating the values from previous tokens weighted by their respective attention scores to decide which parts of the input sequence to focus on. Computing these keys and values repeatedly for every token in a growing sequence would be computationally expensive and memory intensive. The KV-cache addresses this inefficiency by storing the keys and values for previously processed tokens so they can be reused without recalculating them.

Despite its advantages, the KV-cache is not without limitations. For example, transformer models are increasingly applied to tasks requiring the processing of long sequences, such as summarizing lengthy documents, analyzing codebases, or engaging in multi-turn conversations. However, the memory and computational demands of KV-cache grow linearly with the sequence length, creating significant scalability challenges. The transformer models already place heavy demands on GPU and TPU memory, with significant portions allocated for model weights and intermediate computations. Adding a KV-cache, which grows linearly with sequence length, compounds this problem, especially in systems with limited memory capacity. For instance, maintaining large KV-caches in GPU setups with 16-48 GB of memory can lead to resource exhaustion, particularly when serving multiple users or handling long-context tasks.

Cache retrieval latency is another bottleneck, especially as sequence lengths grow. Every new token generated during autoregressive inference requires the model to access and compute attention over all cached tokens. This process becomes progressively slower for longer sequences, introducing noticeable delays in real-time applications like chatbots. While KV-cache avoids re-computation of keys and values, cache retrieval latency grows linearly with sequence length due to increased memory access and communication costs, compounded by the need to process the retrieved data for attention computations.

Thus, in one embodiment, as described in more details in conjunction with FIGS. 2-8, the data processing service 102 provides a transformer architecture that applies a function on keys and values stored in the KV-cache of a given layer to generate the keys and values for subsequent layers in the architecture. In some embodiments, the transformer architecture may include a set of decoder layers. Each decoder layer is associated with a function that transforms the keys and values from a previous decoder layer to the keys and values in the subsequent decoder layer. In some embodiments, only the keys and values of the first decoder layer of a subset of layers are cached and passed to each of the subsequent decoder layers in the subset by applying the function to the keys and values. Since the keys and values of each decoder layer can be computed based on the keys and values of the first decoder layer, the computed keys and values of the intermediate decoder layers are not cached in memory, thus significantly reducing the memory usage for KV-cache for the transformer architecture.

Figure 2:
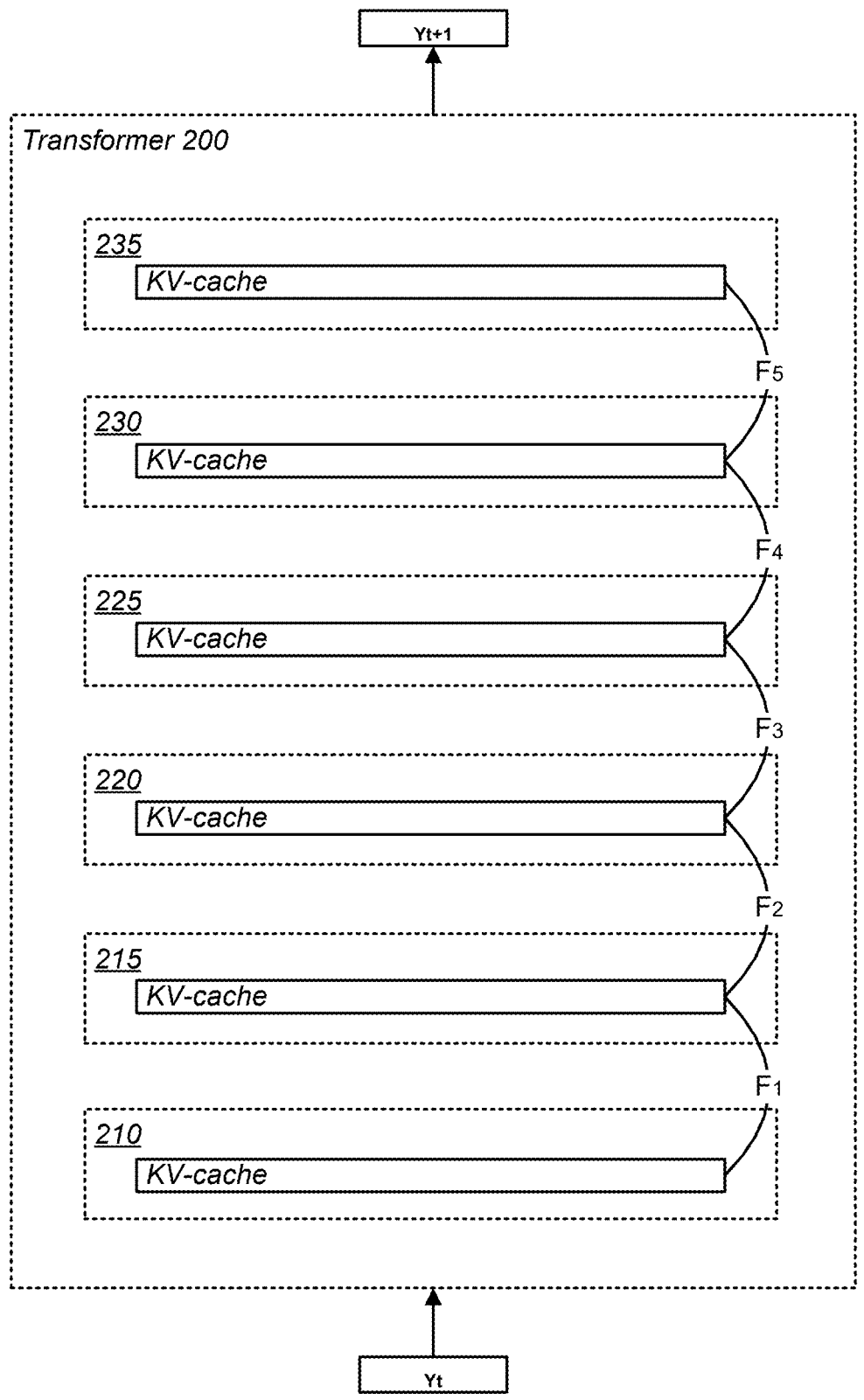
FIG. 2 illustrates a block diagram of an architecture of a transformer model, in accordance with an embodiment.

FIG. 2 illustrates an architecture of a transformer 200, in accordance with an embodiment. As shown in FIG. 2, the transformer 200 may include a set of decoder layers 210, 215, 220, 225, 230, 235. The number of decoder layers may vary depending on design and application of the transformer. In one example, the transformer 200 includes six decoder layers, and in other examples, the number of decoder layers in a transformer 200 may be 12, 24, 48, etc. Therefore, the decoder layers 210-235 illustrated in FIG. 2 may be a subset of the total layers of the transformer architecture 200, and there may be additional decoder layers in between the illustrated decoder layers 210-235 depending on how the transformer architecture is configured.

The decoder layers in the transformer 200 are stacked sequentially, where each layer refines the output of the previous one. The decoder layers share a hierarchical relationship, with each layer building on the computations performed by the previous layer. Each decoder layer has an attention layer that obtains keys, values, queries, and combines these to generate attention outputs. Keys are vectors that encode information about each token in the input sequence. They are used to determine how relevant or important a particular token is to others in the sequence during the attention computation. Values are vectors that contain the actual information associated with each token. After the model determines which tokens are most relevant (using the keys), it retrieves the corresponding values to generate the final representation. In one embodiment, each decoder layer of a transformer model may maintain its own KV-cache, as the keys and values are layer-specific and dependent on the layer's learned weights.

In some embodiments, the data processing service 102 provide a transformer 200 that uses a set of parameters $F_1$, $F_2$, . . . and $F_i$ (hereafter referred to as "F" collectively) to model the transformation between the KV-cache of a previous decoder layer to a KV-cache of a current decoder layer. $F_i$ may denote the set of parameters that map the KV-cache of previous decoder layer i to current decoder layer i+1. Specifically, in one example, a KV-cache ($kv_i$) at decoder layer i, may be represented as, $$kv_i = W_{kv,i} * x_i, \tag{1}$$

Here, $x_i$ is the input (e.g., tokens), and $W_{kv,i}$ is a learnable weight matrix configured to transform the input $x_i$ into the keys and values vectors. Their product creates the transformed keys and values ($kv_i$) needed for the attention mechanism. Similarly, a KV-cache ($kv_{i+1}$) at decoder layer (i+1) may be presented as, $$kv_{i+1} = W_{kv,i+1} * x_{i+1} = W_{kv,i+1} * (x_i + attn(x_i) + ffn(x_i))), \tag{2}$$

Here, $attn(x_i)$ represents an output from an attention layer in decoder layer i, and $ffn(x_i)$ represent an output from feedforward network in decoder layer i. Moreover, $W_{kv,i+1}$ may represent a learnable weight matrix for layer i+1. Therefore, $(x_i + attn(x) + ffn(x))$ represents an input to the next decoder layer (i+1).

In some implementations, the data processing service 102 may determine $x_i$ from $kv_i$ using a linear transformation. In one example, data processing service 102 may multiply $kv_i$ with the inverse or pseudoinverse matrix M, e.g., an approximate inverse, and formula (2) may be presented as, $$kv_{i+1} = W_{kv,i+1} * (M * kv_i + attn(M * kv_i) + ffn(M * kv_i)). \tag{3}$$

Therefore, the KV-cache of a current decoder layer may be modeled or approximated by a set of parameters F applied to the KV-cache of a previous decoder layer, $$kv_{i+1} = F_i(kv_i). \tag{4}$$

Here, the set of parameters $F_i$ is operated on the KV-cache at layer i to update the KV-cache across decoder layers.

In some embodiments, the determination of the set of parameters F may begin with a default/random function, and the data processing service 102 iteratively fits the initial values to approximate the parameters of F. In some embodiments, the set of parameters F is trainable, and its complexity may be tuned depending on the tradeoff between overlap and quality. In some embodiments, F may be a set of parameters that transforms the keys and values for a previous decoder layer i to keys and values for a current decoder layer i+n that is the n-th layer after the decoder layer i. The set of parameters F may be the same or different for different decoder layers in the set. In some cases, the set of parameters F transform keys and values among non-consecutive decoder layers, e.g., from decoder layer 210 to decoder layer 220, etc. In some other cases, the transformer architecture 200 may include additional attention layers between two successive decoder layers. For example, the additional attention layers may be local attention layers which can also share KV-cache.

In some implementations, for a given subset of layers, the data processing service 102 only stores the keys and values of the first decoder layer in the subset, e.g., decoder layer 210, and the learnable set of parameters F, but not store the keys and the values of the subsequent decoder layer. At each subsequent decoder layer, the data processing service 102 retrieves the KV-cache of the first decoder layer and use the set of parameters F to determine the keys and values of the current decoder layer. For example, to determine the keys and values for the decoder layer 220, the data processing service 102 may retrieve the KV-cache of the decoder layer 210 from a memory, and applies the parameters F to the keys and values of the decoder layer 210 to obtain keys and values of the decoder layer 215. Then, the data processing service 102 applies the parameters F to the keys and values of the decoder layer 215 to obtain the keys and values of the decoder layer 220, and so on. In the meantime, the data processing service 102 does not store the generated keys and values for the intermediate decoder layers, such as the decoder layer 215 and the decoder layer 220 after the outputs from each layer have been generated.

As shown in FIG. 2, the transformer 200 receives an input token $Y_t$. Each decoder layer i is associated with its own keys and values. To generate the keys and values for a current decoder layer, a function (e.g., trained values of a set of parameters) may be applied to the keys and values for a previous decoder layer. Based on the inputs, queries to the current decoder layer may be obtained. The data processing service 102 may combine the queries with the keys and values for the current decoder layer to generate one or more attention outputs for the current decoder layer. After the input passes through the set of decoder layers, an outcome $Y_{t+1}$ may be generated as an output token. The output token $Y_{t+1}$ is then used as the input token for the next iteration to generate the next output token in an auto-regressive manner.

This transformer architecture addresses the memory inefficiency associated with managing KV-caches especially in large-scale transformer models by introducing a trainable transformation function. The function learns how to adapt and transform the KV-cache dynamically as it passes from one decoder layer to the next. This allows the KV-cache of the first decoder layer to remain useful across all layers without requiring explicit storage for every layer's intermediate KV-caches. By doing so, the transformer reduces the need to store separate KV-caches for each decoder layer. The transformation function is designed to be lightweight, reducing additional memory and computational overhead while still enabling effective reuse of the KV-cache.

This transformer architecture reduces the memory requirements of large networks. For example, in some cases, it reduces memory usage from approximately 30 GB to as little as 5 GB, depending on the model size. Such a reduction is crucial for running large-scale models on hardware with limited memory resources, such as High Bandwidth Memory (HBM), Dynamic Random-Access Memory (DDR), etc. Ultimately, only the KV cache for the first layer in a given subset and the parameters of the transformation function need to be stored, making this approach both memory-efficient and scalable for modern transformer-based architectures.

Returning to the system of FIG. 1, the data storage system 110 includes a device (e.g., a disc drive, a hard drive, or a semiconductor memory) used for storing database data (e.g., a stored data set, at least a portion of a stored data set, data for executing a query). The data storage system 110 may store data in the format of data tables, unstructured or structured data, and the like, that can be used to train or perform inference using the machine learning models described herein. For example, the data storage system 110 may store significant amounts of training data that can be used to train or fine tune parameters of machine learning models. In one embodiment, the data storage system 110 may also store trained models (e.g., parameters of the models) that have been trained by compute resources of the data processing service 102.

In one embodiment, the data storage system 110 includes a distributed storage system for storing data and may include a commercially provided distributed storage system service. Thus, the data storage system 110 may be managed by a separate entity than an entity that manages the data processing service 102, for example, a customer or user of the data processing service 102. In another embodiment, the data management system 110 may be managed by the same entity that manages the data processing service 102. Thus, coupled with the serverless implementation of compute resources of the data layer 108, the data processing service 102 may manage access controls to user data stored in the data storage system 110, maintenance tasks for the user data, and the like so that an entity user of the data processing service 102 without separately configuring and deploying infrastructure.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 800 as described with FIG. 8.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

The model serving system 130 includes resources for deploying one or more machine learning models. In one instance, the machine learning models are large-scale models with a significant number of weights or parameters. The models may be configured to perform natural language processing (NLP) tasks, audio processing tasks, image processing tasks, video processing tasks, and the like. For example, given a prompt, a model may generate a response or expand on the prompt in a human-like text. In one embodiment, the model serving system 130 receives input data (e.g., text data, audio data, image data, or video data) and encodes the input data into a set of input tokens. The model serving system 130 applies the machine learning model to generate the output data (e.g., text data, audio data, image data, or video data) including a set of output tokens.

In one embodiment, the machine learning models are configured as a transformer neural network architecture including one or more attention layers. However, it is appreciated that in other embodiments, the machine learning models can be configured as any other appropriate architecture including, but not limited to, long short-term memory (LSTM) networks, Markov networks, BART, generative-adversarial networks (GAN), diffusion models (e.g., Diffusion-LM), and the like.

In one embodiment, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large-scale models that are trained on a large corpus of training data (e.g., texts, images, audio, or video). For example, when the model is an LLM, the LLM may be trained on massive amounts of text data, often involving millions or billions of words or text units. The large amount of training data from various data sources allows the LLM to generate outputs for many inference tasks. A machine learning model may have a significant number of parameters in a deep neural network (e.g., transformer architecture), for example, at least 1 billion, at least 50 billion, at least 100 billion, at least 500 billion, at least 1 trillion, at least 2 trillion parameters.

Since the parameter size and the amount of computational power for training or performing inference on the machine learning models may be significantly high, in one embodiment, the model serving system 130 is configured an infrastructure configured with, for example, supercomputers that provide enhanced computing capability via one or more hardware accelerators, such as graphic processor units (GPUs), tensor processor units (TPUs), and/or neural processor units (NPUs). In one instance, the models may be trained and hosted on a cloud infrastructure service provided by the data processing service 102.

Figure 3:
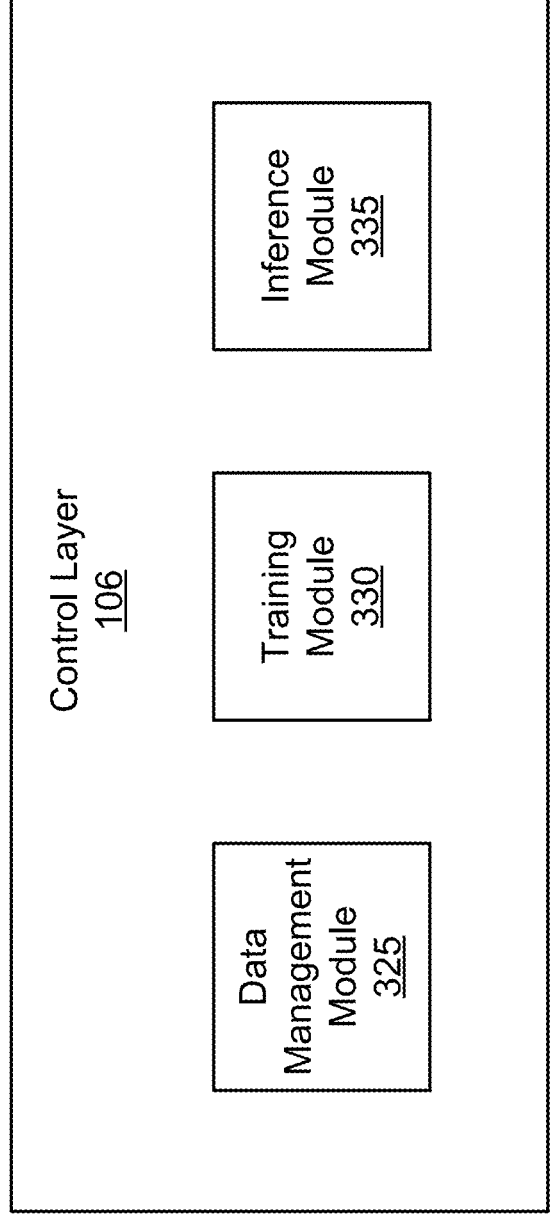
FIG. 3 is a block diagram of an example architecture of a control layer 106, in accordance with an embodiment.

FIG. 3 is a block diagram of an example architecture of a control layer 106, in accordance with an embodiment. In one embodiment, the control layer 106 includes a data management module 325, a training module 330, and an inference module 235.

The data management module 325 generates and manages the training datasets for training one or more machine learning models that are to be deployed on the model serving system 130 and/or on other systems by the data processing service 102. In one instance, the training dataset may be stored or is constructed from data stored in the data storage system 110. In one embodiment, for a given model to be trained, the data management module 325 obtains a training dataset including a set of training instances.

In one embodiment, as the machine learning models are deployed and users perform inference using the machine learning models, the data management module 325 may obtain feedback from users with respect to the outputs that were generated by the machine learning models during the inference process. In such an embodiment, the data management module 325 obtains feedback to determine whether the feedback is positive or negative, and the data management module 325 may update the training dataset to include training instances where the outputs were known to have positive feedback from the user. The updated training dataset may then be used to fine-tune parameters of the machine learning models.

The training module 330 instructs and coordinates training of one or more machine learning models. In one embodiment, the training module 330 coordinates training on compute resources of the data layer 108 that are configured with multiple hardware accelerators to accelerate the training process of large-scale models.

In one embodiment, the training module 330 trains the parameters or weights of the transformer architecture described in conjunction with FIG. 2 that includes the set of parameters F that is used to generate the keys and values for a current decoder layer from the keys and values of a previous decoder layer.

Figure 4:
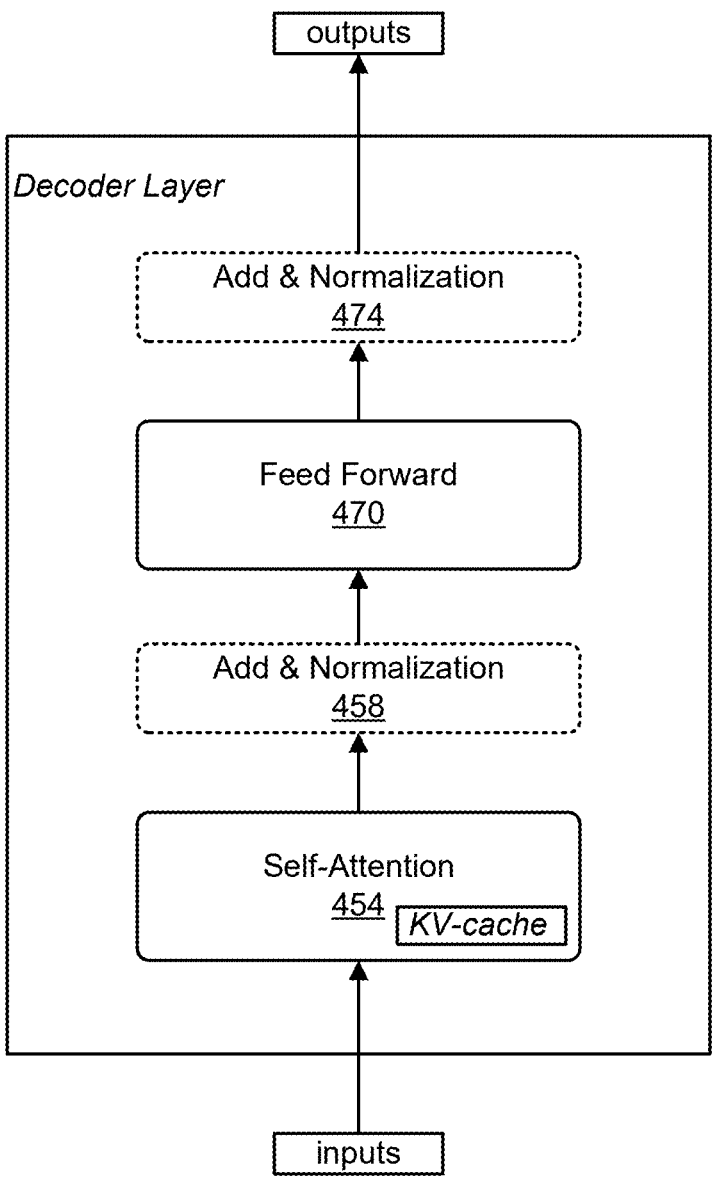
FIG. 4 illustrates an architecture of a decoder layer in a transformer architecture, in accordance with an embodiment.

FIG. 4 illustrates an architecture of a layer in a transformer architecture, in accordance with an embodiment. In one embodiment, the training module 330 trains a transformer architecture that includes one or more decoder layers each configured with at least the components shown in FIG. 4. As shown in FIG. 4, the decoder layer receives a set of inputs to generate a set of outputs. A decoder layer may include a self-attention block 454. The self-attention block 454 is coupled to receive inputs and generate one or more keys, one or more queries, and one or more values. The queries, keys, and value are combined to generate a set of attention outputs. The inputs to the self-attention block 454 may be obtained from the set of input tokens or a set of outputs received from a previous decoder. The decoder may also include other blocks including a first add and normalization block 458 placed after the self-attention block 454, a feed forward block 470 placed after the first add and normalization block 458, and a second add and normalization block 474 placed after the feed forward block 470.

In some embodiments, the training module 330 may obtain a batch of training examples for a current iteration, and applies the transformer architecture (e.g., with the decoder layer in FIG. 4) to one or more input tokens obtained from the batch of training examples to generate one or more estimated outputs. Each decoder layer in the set of decoder layers may generate estimated keys and estimated values for the current decoder layer. The estimated keys and the estimated values for the current decoder layer i+1 are generated by applying estimated values for the set of parameters (e.g. the function $F_i$ for transforming KV-cache described in conjunction with FIG. 2) to keys and values for the previous transformer layer i. In some cases, the training module 330 may compute a loss function indicating a difference between one or more output tokens obtained from the batch of training examples and the estimated outputs and backpropagate one or more terms obtained from the loss function to update the set of parameters of the transformer architecture. In some implementations, this process is repeated for the next remaining iterations until a convergence criterion is reached.

Figure 5:
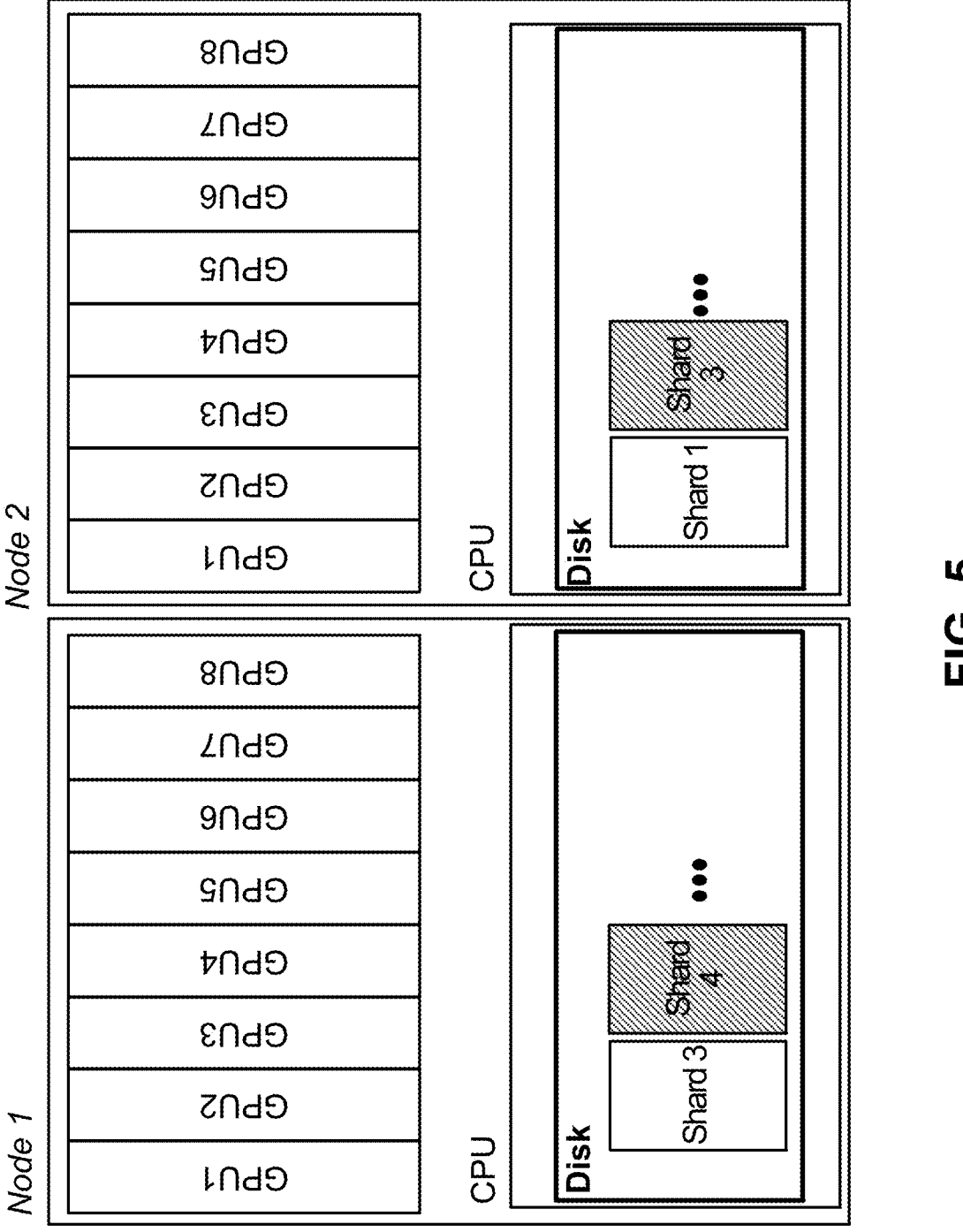
FIG. 5 illustrates a block diagram of an architecture of a compute resource, in accordance with an embodiment.

FIG. 5 illustrates a block diagram of an architecture of a compute resource, in accordance with an embodiment. In some embodiments, the compute resource in FIG. 5 may be use for training machine learning models. In one embodiment, the compute resource of the data layer 108 or the control layer 106 is configured with one or more nodes. A server node may include one or more central processing units (CPUs) and one or more hardware accelerators. In the example shown in FIG. 5, the hardware accelerators are configured as graphic processor units (GPUs), but it is appreciated that in other embodiments, the hardware accelerators may be configured as a different type of accelerator, such as neural processor units (NPUs), tensor processor units (TPUs), and the like. In the implementation shown in FIG. 5, one node has eight GPUs. Each GPU may be configured with high-bandwidth memory (HBM) and local memory (e.g., SRAM) to store data such as model parameters, intermediate states, and the like during training and inference.

Figure 6:
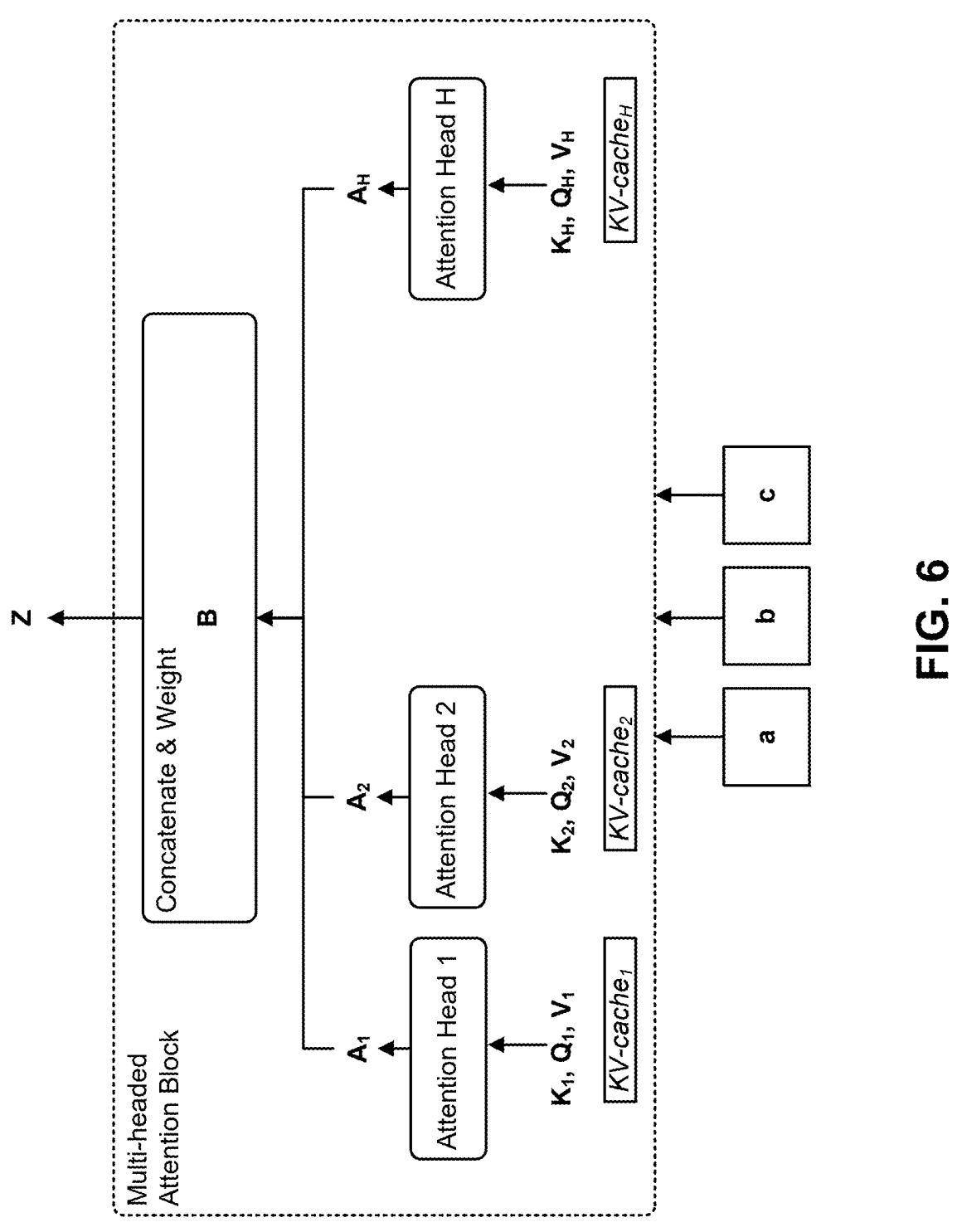
FIG. 6 illustrates an architecture of an attention block with multi-head attention, in accordance with an embodiment.

FIG. 6 illustrates an architecture of an attention block with multi-head attention, in accordance with an embodiment. In one embodiment, the training module 330 trains a transformer architecture that includes one or more attention blocks with a multi-headed structure. For example, any one or more of or all of the self-attention blocks (e.g., self-attention block 454) in a decoder may have the multi-headed structure.

As shown in FIG. 6, an attention block with a multi-headed structure is coupled to receive a key input a, a query input b, and a value input c and generate a set of attention representations. Specifically, the multi-headed structure includes a plurality of attention heads. Each attention head h is coupled to receive its own key $K_h$, query $Q_h$, value $V_h$, and generate a respective output matrix $A_h$ by tensor multiplying the key $K_h$ with the query $Q_h$, applying a softmax function, and tensor multiplying the value $V_h$ to the output. The output matrices $A_1$, $A_2$, . . . , $A_H$ are concatenated together, and an attention weight matrix B is applied to generate the set of attention operations Z.

In multi-head attention, the input may be processed through multiple attention heads that perform computations independently. In some embodiments, the attention head may be a self-attention block (e.g., self-attention block 454 in FIG. 4). Since each head has its own set of matrices, and performs computations for each attention head are independent, the heads may perform the computations simultaneously. By using multiple heads, the transformer may compute all of them in parallel, leveraging the full computational power of the hardware.

In some embodiments, instead of performing the computations for each head on a single device, each device (e.g., each GPU) in a compute resource may be dedicated to performing the operations of a respective attention head for the transformer architecture. Each device computes only part of the matrix multiplication (e.g., one attention head), which reduces the memory footprint and speeds up computation. In one example, a first subset of keys and values for the previous decoder layer may be stored on a first device and a second subset of keys and values for the previous decoder layer may be stored on a second device. Moreover, the set of parameters F for generating the keys and values may also be divided, such that a respective portion of parameters are used by a respective attention head for generating the keys and values for the attention head for a given decoder layer.

During the training process, the training module 330 may generate a first subset of keys and values for at least a first attention head for the current decoder layer by applying at least a portion of the set of parameters to the first subset keys and values for the first attention head of the previous decoder layer, and generate a second subset of keys and values for a second attention head for the current decoder layer by applying at least another portion of the set of parameters to the second subset of keys and values for the second attention head of the previous decoder layer. This process is repeated for the remaining layers in the subset, and until estimated outputs are generated to compute the loss function.

In some embodiments, the set of parameters F used to transform keys and values from a previous decoder layer to a current decoder layer may be independent or different for each attention head of the transformer architecture. Alternatively, two or more attention heads may share the same set of parameters for transforming the keys and values. In one example, the keys and values at a current decoder layer on a first attention head are generated by applying the function to the keys and values at a previous decoder layer on the same attention head that is executed at the same device (e.g., same GPU).

Returning to the diagram of FIG. 3, the inference module 335 deploys the trained transformer architectures on, for example, the model serving system 130. The trained models can process requests received by the model serving system 130 for inference and generate responses to the requests. As described in conjunction with FIG. 2, the inference module 335 applies trained parameters of the transformer architecture to a set of input tokens obtained from the request to auto-regressively generate a set of output tokens. The trained parameters include the set of parameters F for transforming the keys and values. In one embodiment, for a given subset of decoder layers, the inference module 335 generates the keys and values for a first decoder layer in the subset and stores the keys and values for that layer in a KV-cache. For the subsequent layers in the subset, the inference module 335 generates the keys and values for a subsequent layer by applying the set of parameters F to the keys and values of the previous layer. The keys and values may be freed afterwards.

In one embodiment, when each decoder layer has the architecture of FIG. 4, the KV-cache for the first decoder layer in a subset may be associated with the self-attention block 454, and the keys and values in the KV-cache may be retrieved when performing the self-attention operation 454 for the first decoder layer. In one embodiment, when each decoder layer has the architecture of FIG. 6 with one or more attention heads, the KV-cache for the first decoder layer in a subset may be associated with the self-attention block of each attention head, and the keys and values in the KV-cache may be retrieved when performing the self-attention operation for each attention head. For example, as shown in FIG. 6, when the decoder layer is the first decoder layer in the subset, each attention head h is associated with a KV-cache$_h$ stored on a respective device (e.g. GPU device) for processing the attention head h.

In one embodiment, when the operations of the transformer model are performed across multiple GPU devices in parallel using tensor parallelism (TP), the steps include one or more communication steps where outputs generated for an operation at a given device is communicated to other devices. One such example is an all-reduce operation, where outputs from the multiple devices are combined and the results of the reduction are distributed to each device for the next operation. For example, an all-reduce operation happens at the end of an attention operation (e.g., to combine the attention outputs across different attention heads) or at the end of a feed forward operation. The computation cores of a device may sit idle during these communication steps.

Thus, in one embodiment, the inference module 335 schedules the operations for generating the keys and values for the attention operation of a current decoder layer when the communication steps for an operation of a previous decoder layer is being performed. This way, the keys and values for the current decoder layer may be generated by applying the set of parameters F while the communication steps for the previous decoder layer are happening, so that the keys and values are ready when the attention operation for the current decoder layer is performed, further reducing any delays for executing the transformer architecture. The inference module 335 performs the computation using the set of parameters F in parallel with the communication steps (e.g., all-reduce steps) of TP operations to get better and improved utilization of the compute cores of the devices. In this way, the compute cores may be used more efficiently and at least a portion of the communication steps for all-reduce and the compute steps for generating the KV-caches via the trained set of parameters F overlap at the same time.

While the specification and figures illustrate a primary example of a transformer architecture having a set of decoders, it is appreciated that the method of generating keys and values can be applied to any transformer architecture that is configured with one or more attention blocks. For example, the method and system described herein can be applied to large language models (LLM's) with a set of decoders, such as generative pre-trained transformers (GPT) or encoding models with a set of encoders, such as bi-directional encoding representations from transformers (BERT). As another example, the transformer architecture may be a cross-modality generation model such as a text-to-image generation model, an image-to-text generation model, a text-to-audio generation model, and the like.

Method of Generating Keys and Values for Decoder Layer Using a Function

FIG. 7 is a flowchart of a method for determining data elements in a data set that are relevant to a concept using machine-learning models, in accordance with an embodiment. The process shown in FIG. 7 may be performed by one or more components (e.g., the control layer 106 or compute resources of the data layer 108) of a data processing system/service (e.g., the data processing service 102). Other entities may perform some or all of the steps in FIG. 7. The data processing service 102 as well as the other entities may include some or of the component of the machine (e.g., computer system) described in conjunction with FIG. 7. Embodiments may include different and/or additional steps, or perform the steps in different orders.

The data processing service 102 receives 720 a request for execution from a client device. The data processing service 102 accesses 722 a machine learning transformer architecture which includes at least a set of decoder layers. Each layer in the set of decoder layers is associated with a respective KV-cache. The data processing service 102 applies 724 the transformer architecture to one or more input tokens obtained from the request to generate one or more output tokens. For each decoder layer in the set of decoder layers, the data processing service 102 generates 726 keys and values for a current decoder layer. The keys and the values for the current decoder layer are generated by applying trained values for a set of parameters to keys and values for a previous decoder layer. The data processing service 102 obtains 728 queries from inputs to the current decoder layer and generates 730 one or more attention outputs for the current decoder layer by at least combining the queries with the keys and the values for the current decoder layer. The data processing service 102 generates 732 a response to the request from the one or more output tokens and provides 734 the response to the client device.

Figure 8:
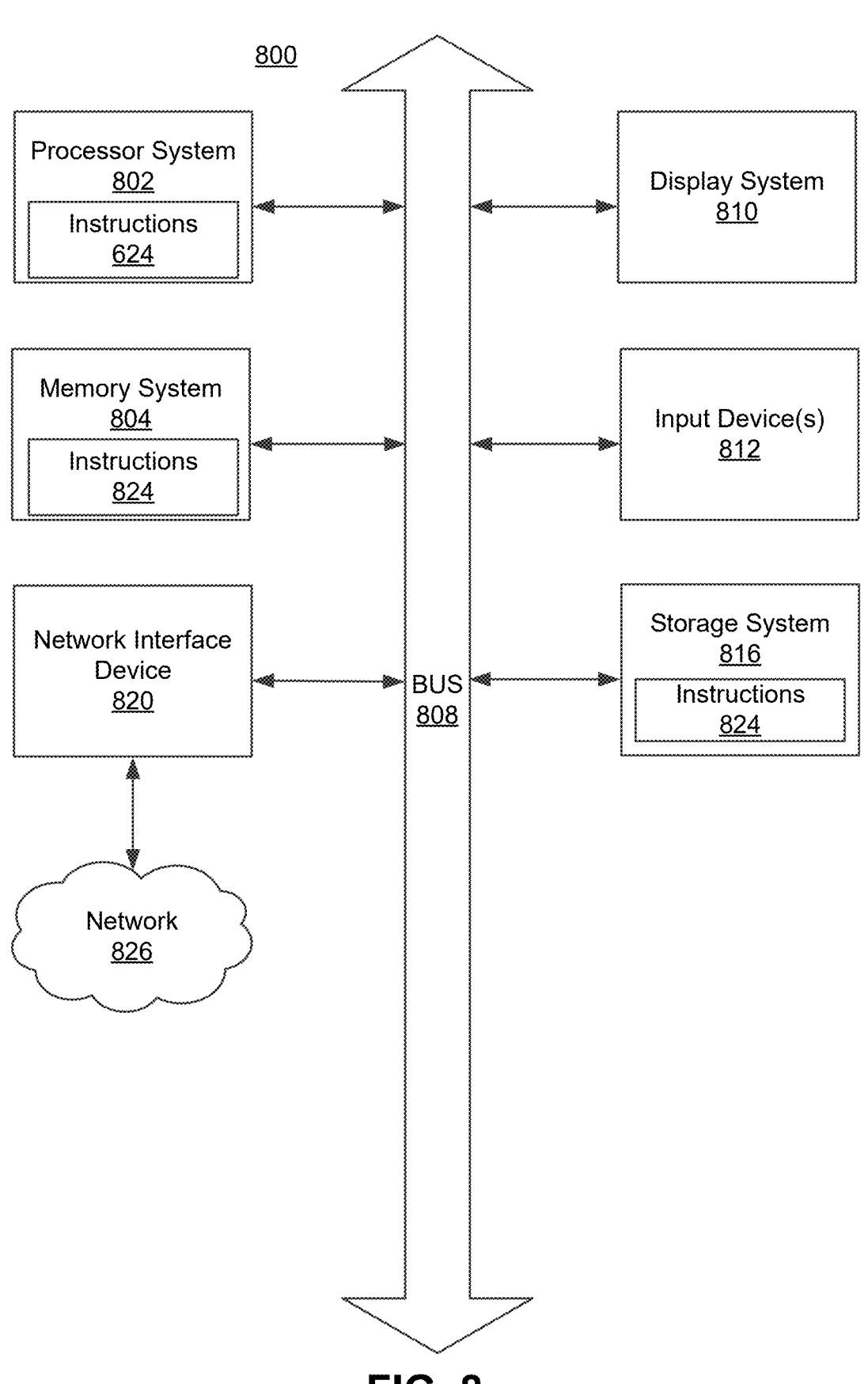
FIG. 8 illustrates a computer for performing the functionalities of systems and modules, in accordance with an embodiment.

Turning now to FIG. 8, illustrated is an example machine to read and execute computer readable instructions, in accordance with an embodiment. Specifically, FIG. 8 shows a diagrammatic representation of the data processing service 102 (and/or data processing system) in the example form of a computer system 800. The computer system 800 is structured and configured to operate through one or more other systems (or subsystems) as described herein. The computer system 800 can be used to execute instructions 824 (e.g., program code or software) for causing the machine (or some or all of the components thereof) to perform any one or more of the methodologies (or processes) described herein. In executing the instructions, the computer system 800 operates in a specific manner as per the functionality described. The computer system 800 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 800 may be a server computer, a client computer, a personal computer (PC), a tablet PC, a smartphone, an internet of things (IoT) appliance, a network router, switch or bridge, or other machine capable of executing instructions 824 (sequential or otherwise) that enable actions as set forth by the instructions 824. Further, while only a single machine is illustrated, the term "machine" shall also be taken to include any collection of machines that individually or jointly execute instructions 824 to perform any one or more of the methodologies discussed herein.

The example computer system 800 includes a processing system 802. The processor system 802 includes one or more processors. The processor system 802 may include, for example, a central processing unit (CPU), a graphics processing unit (GPU), a tensor processing unit (TPU), a neural network processor (NPU), a digital signal processor (DSP), a controller, a state machine, one or more application specific integrated circuits (ASICs), one or more radio-frequency integrated circuits (RFICs), or any combination of these. The processor system 802 executes an operating system for the computing system 800. The computer system 800 also includes a memory system 804. The memory system 804 may include or more memories (e.g., dynamic random access memory (RAM), static RAM, cache memory). The computer system 800 may include a storage system 816 that includes one or more machine readable storage devices (e.g., magnetic disk drive, optical disk drive, solid state memory disk drive).

The storage unit 816 stores instructions 824 (e.g., software) embodying any one or more of the methodologies or functions described herein. For example, the instructions 824 may include instructions for implementing the functionalities of the transaction module 330 and/or the file management module 335. The instructions 824 may also reside, completely or at least partially, within the memory system 804 or within the processing system 802 (e.g., within a processor cache memory) during execution thereof by the computer system 800, the main memory 804 and the processor system 802 also constituting machine-readable media. The instructions 824 may be transmitted or received over a network 826, such as the network 826, via the network interface device 820.

The storage system 816 should be taken to include a single medium or multiple media (e.g., a centralized or distributed database, or associated caches and servers communicatively coupled through the network interface system 820) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 800 can include a display system 810. The display system 810 may driver firmware (or code) to enable rendering on one or more visual devices, e.g., drive a plasma display panel (PDP), a liquid crystal display (LCD), or a projector. The computer system 800 also may include one or more input/output systems 812. The input/output (IO) systems 812 may include input devices (e.g., a keyboard, mouse (or trackpad), a pen (or stylus), microphone) or output devices (e.g., a speaker). The computer system 800 also may include a network interface system 820. The network interface system 820 may include one or more network devices that are configured to communicate with an external network 826. The external network 826 may be a wired (e.g., ethernet) or wireless (e.g., WiFi, BLUETOOTH, near field communication (NFC).

The processor system 802, the memory system 804, the storage system 816, the display system 810, the IO systems 812, and the network interface system 820 are communicatively coupled via a computing bus 808.

ADDITIONAL CONSIDERATIONS

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method, comprising:
receiving, from a client device, a request for execution;
accessing a machine-learning transformer architecture including at least a subset of decoder layers, wherein a first decoder layer in the subset of decoder layers is associated with a KV-cache;
applying the transformer architecture to one or more input tokens obtained from the request to generate one or more output tokens, for each decoder layer in the subset of decoder layers:
generating keys and values for a current decoder layer, wherein the keys and the values for the current decoder layer are generated by applying trained values for a set of parameters to keys and values for a previous decoder layer,
obtaining queries from inputs to the current decoder layer, and
generating one or more attention outputs for the current decoder layer by at least combining the queries with the keys and the values for the current decoder layer;
generating a response to the request from the one or more output tokens; and
providing the response to the client device.

2. The method of claim 1, further comprising:
obtaining a batch of training examples for a current iteration;
applying the transformer architecture to one or more input tokens obtained from the batch of training examples to generate one or more estimated outputs, for each decoder layer in the set of decoder layers:
generating estimated keys and estimated values for the current decoder layer, wherein the estimated keys and the estimated values for the current decoder layer are generated by applying estimated values for the set of parameters to keys and values for the previous decoder layer;
computing a loss function indicating a difference between one or more output tokens obtained from the batch of training examples and the estimated outputs; and
backpropagating one or more terms obtained from the loss function to update the set of parameters of the transformer architecture.

3. The method of claim 1, wherein a first subset of keys and values for the previous decoder layer are stored on a first device and a second subset of keys and values for the previous decoder layer are stored on a second device, and wherein generating the keys and the values for the current decoder layer comprises:
generating a first subset of keys and values for a first attention head of the current decoder layer by applying at least a portion of the set of parameters to the first subset keys and values for the previous decoder layer; and
generating a second subset of keys and values for a second attention head of the current decoder layer by applying at least another portion of the set of parameters to the second subset of keys and values for the previous decoder layer.

4. The method of claim 3, wherein the first device and the second device are at least one of graphics processor units (GPU's), tensor processor units (TPU's), and neural processor units (NPU's).

5. The method of claim 1, wherein one or more operations of the previous decoder layer are executed on a set of hardware accelerator devices, and wherein the keys and values for the current decoder layer are generated during one or more communication steps between the set of hardware accelerator devices for the previous decoder layer.

6. The method of claim 1, wherein when the previous decoder layer is the first decoder layer in the subset, the keys and the values for the previous decoder layer are obtained from the KV-cache for the first decoder layer.

7. The method of claim 1, further comprising:
after generating the one or more attention outputs for the current decoder layer, freeing the generated keys and values for the current decoder layer from memory.

8. A non-transitory computer readable storage medium comprising stored program code, the program code comprising instructions, the instructions when executed causes a processor system to:
receive, from a client device, a request for execution;
access a machine-learning transformer architecture including at least a subset of decoder layers, wherein a first decoder layer in the subset of decoder layers is associated with a KV-cache;
apply the transformer architecture to one or more input tokens obtained from the request to generate one or more output tokens, for each decoder layer in the subset of decoder layers:
generating keys and values for a current decoder layer, wherein the keys and the values for the current decoder layer are generated by applying trained values for a set of parameters to keys and values for a previous decoder layer,
obtaining queries from inputs to the current decoder layer, and
generating one or more attention outputs for the current decoder layer by at least combining the queries with the keys and the values for the current decoder layer;
generate a response to the request from the one or more output tokens; and
provide the response to the client device.

9. The non-transitory computer readable storage medium of claim 8, wherein the instructions further cause the processor to:
obtain a batch of training examples for a current iteration;
apply the transformer architecture to one or more input tokens obtained from the batch of training examples to generate one or more estimated outputs, for each decoder layer in the set of decoder layers:
generate estimated keys and estimated values for the current decoder layer, wherein the estimated keys and the estimated values for the current decoder layer are generated by applying estimated values for the set of parameters to keys and values for the previous decoder layer;
compute a loss function indicating a difference between one or more output tokens obtained from the batch of training examples and the estimated outputs; and
backpropagate one or more terms obtained from the loss function to update the set of parameters of the transformer architecture.

10. The non-transitory computer readable storage medium of claim 8, wherein a first subset of keys and values for the previous decoder layer are stored on a first device and a second subset of keys and values for the previous decoder layer are stored on a second device, and wherein the instructions to generate the keys and the values for the current decoder layer further cause the processor to:

generate a first subset of keys and values for a first attention head of the current decoder layer by applying at least a portion of the set of parameters to the first subset keys and values for the previous decoder layer; and generate a second subset of keys and values for a second attention head of the current decoder layer by applying at least another portion of the set of parameters to the second subset of keys and values for the previous decoder layer.

11. The non-transitory computer readable storage medium of claim 10, wherein the first device and the second device are at least one of graphics processor units (GPU's), tensor processor units (TPU's), and neural processor units (NPU's).

12. The non-transitory computer readable storage medium of claim 8, wherein one or more operations of the previous decoder layer are executed on a set of hardware accelerator devices, and wherein the keys and values for the current decoder layer are generated during one or more communication steps between the set of hardware accelerator devices for the previous decoder layer.

13. The non-transitory computer readable storage medium of claim 8, wherein when the previous decoder layer is the first decoder layer in the subset, the keys and the values for the previous decoder layer are obtained from the KV-cache for the first decoder layer.

14. The non-transitory computer readable storage medium of claim 8, wherein the instructions further cause the processor to:

after generating the one or more attention outputs for the current decoder layer, free the generated keys and values for the current decoder layer from memory.

15. A computer system, comprising:

a computer processor; and a non-transitory computer readable storage medium comprising stored instructions that when executed by the computer processor, cause the computer system to:

receive, from a client device, a request for execution;

access a machine-learning transformer architecture including at least a subset of decoder layers, wherein a first decoder layer in the subset of decoder layers is associated with a KV-cache;

apply the transformer architecture to one or more input tokens obtained from the request to generate one or more output tokens, for each decoder layer in the subset of decoder layers:

generating keys and values for a current decoder layer, wherein the keys and the values for the current decoder layer are generated by applying trained values for a set of parameters to keys and values for a previous decoder layer, obtaining queries from inputs to the current decoder layer, and generating one or more attention outputs for the current decoder layer by at least combining the queries with the keys and the values for the current decoder layer;

generate a response to the request from the one or more output tokens; and provide the response to the client device.

16. The computer system of claim 15, wherein the instructions further cause the computer system to:

obtain a batch of training examples for a current iteration;

apply the transformer architecture to one or more input tokens obtained from the batch of training examples to generate one or more estimated outputs, for each decoder layer in the set of decoder layers:

generate estimated keys and estimated values for the current decoder layer, wherein the estimated keys and the estimated values for the current decoder layer are generated by applying estimated values for the set of parameters to keys and values for the previous decoder layer;

compute a loss function indicating a difference between one or more output tokens obtained from the batch of training examples and the estimated outputs; and backpropagate one or more terms obtained from the loss function to update the set of parameters of the transformer architecture.

17. The computer system of claim 15, wherein a first subset of keys and values for the previous decoder layer are stored on a first device and a second subset of keys and values for the previous decoder layer are stored on a second device, and wherein the instructions to generate the keys and the values for the current decoder layer further cause the computer system to:

generate a first subset of keys and values for a first attention head of the current decoder layer by applying at least a portion of the set of parameters to the first subset keys and values for the previous decoder layer; and generate a second subset of keys and values for a second attention head of the current decoder layer by applying at least another portion of the set of parameters to the second subset of keys and values for the previous decoder layer.

18. The computer system of claim 17, wherein the first device and the second device are at least one of graphics processor units (GPU's), tensor processor units (TPU's), and neural processor units (NPU's).

19. The computer system of claim 15, wherein one or more operations of the previous decoder layer are executed on a set of hardware accelerator devices, and wherein the keys and values for the current decoder layer are generated during one or more communication steps between the set of hardware accelerator devices for the previous decoder layer.

20. The computer system of claim 15, wherein when the previous decoder layer is the first decoder layer in the subset, the keys and the values for the previous decoder layer are obtained from the KV-cache for the first decoder layer.

* * * * *